(12) United States Patent
Lawrance (10) Patent No.: US 8,762,881 B2
(45) Date of Patent: Jun. 24, 2014

(54) TAKING SCREENSHOTS OF A FAILED APPLICATION

(75) Inventor: Steven S. Lawrance, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 308 days.

(21) Appl. No.: 12/837,433

(22) Filed: Jul. 15, 2010

(65) Prior Publication Data

US 2012/0017170 A1 Jan. 19, 2012

(51) Int. Cl.
*G06F 3/048* (2013.01)

(52) U.S. Cl.
USPC ............ 715/788; 715/781; 715/790; 717/124

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |

(Continued)

OTHER PUBLICATIONS

Microsoft Support, How to obtain a Console Window Handle, Article ID 124103: , Jul. 11, 2005, Revision 1.3, http://support.microsoft.com/kb/124103.*

*Primary Examiner* — Matt Kim
*Assistant Examiner* — Mahelet Shiberou
(74) *Attorney, Agent, or Firm* — Ingrassia Fisher & Lorenz, P.C.

(57) ABSTRACT

An approach for taking screenshots of a failed application is disclosed. The method includes running a test of a module, where the test is run in a single operating system process that uses a plurality of web browser windows on a display screen. The method further includes receiving a signal to indicate a screenshot that is requested after the test fails in order to determine a cause of the test failure and capturing screenshots for each of the plurality of web browser windows, where the captured screenshots exclude elements that are unrelated to the test. The capturing screenshots includes using an iterative process capturing each of the plurality of screenshots one at a time.

9 Claims, 6 Drawing Sheets

(56) References Cited

U.S. PATENT DOCUMENTS

| | | |
|---|---|---|
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 * | 5/2004 | Brodersen et al. .................... 1/1 |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0087950 A1 * | 7/2002 | Brodeur et al. ............... 717/124 |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0149879 A1 * | 7/2005 | Jobs et al. ..................... 715/796 |
| 2005/0278629 A1 * | 12/2005 | Chailleux ..................... 715/704 |
| 2007/0174816 A1 * | 7/2007 | Cavanaugh et al. .......... 717/124 |
| 2008/0127095 A1 * | 5/2008 | Brennan et al. .............. 717/124 |
| 2008/0244444 A1 * | 10/2008 | Bauman et al. .............. 715/806 |
| 2009/0150868 A1 * | 6/2009 | Chakra et al. ................. 717/125 |
| 2009/0249189 A1 * | 10/2009 | Jania et al. ..................... 715/234 |
| 2010/0231897 A1 * | 9/2010 | Hofeldt et al. .................. 356/73 |
| 2010/0257450 A1 * | 10/2010 | Go et al. ....................... 715/733 |
| 2011/0047488 A1 * | 2/2011 | Butin et al. .................... 715/762 |
| 2011/0231823 A1 * | 9/2011 | Fryc et al. ..................... 717/125 |
| 2011/0289489 A1 * | 11/2011 | Kumar et al. .................. 717/135 |

* cited by examiner

TAKING SCREENSHOTS OF A FAILED APPLICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to capturing screenshots of a failed application for use in testing.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

When testing various software modules that may be deployed to remote locations, screenshots are used for debugging the tests. Such screenshots are used to ascertain why a particular test has failed. Typically, a screenshot directed to revealing a failed test case are done in a full-screen fashion. However, a drawback of this approach is that some windows may overlap other windows, thus obscuring possibly important screenshot information.

BRIEF SUMMARY

An approach for taking screenshots of a failed application is disclosed. The method includes running a test of a module, where the test is run in a single operating system process that uses a plurality of web browser windows on a display screen. The method further includes receiving a signal to indicate a screenshot that is requested after the test fails in order to determine a cause of the test failure and capturing screenshots for each of the plurality of web browser windows, where the captured screenshots exclude elements that are unrelated to the test. The capturing screenshots includes using an iterative process capturing each of the plurality of screenshots one at a time. In accordance with embodiments, there are provided mechanisms and methods for taking screenshots of a failed application. These mechanisms and methods for taking screenshots of a failed application can enable embodiments to provide running a test of a module, such as a module used in a multi-tenant database system. The ability of embodiments to provide receiving a signal to indicate a screenshot is requested after the test fails in order to determine a cause of the test failure and can enable capturing screenshots for each of the plurality of web browser windows.

In an embodiment and by way of example, a method for taking screenshots of a failed application. One example method embodiment includes running a test of a module, where the test is run in a single operating system process that uses a plurality of web browser windows on a display screen. The method embodiment further includes receiving a signal to indicate a screenshot that is requested after the test fails in order to determine a cause of the test failure and capturing screenshots for each of the plurality of web browser windows, where the captured screenshots exclude elements that are unrelated to the test.

While the present invention is described with reference to an embodiment in which techniques for taking screenshots of a failed application are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided for taking screenshots of a failed application, which may be used in a multi-tenant database environment, or any other suitable environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing taking screenshots of a failed application will be described with reference to example embodiments.

System Overview

Figure 1:
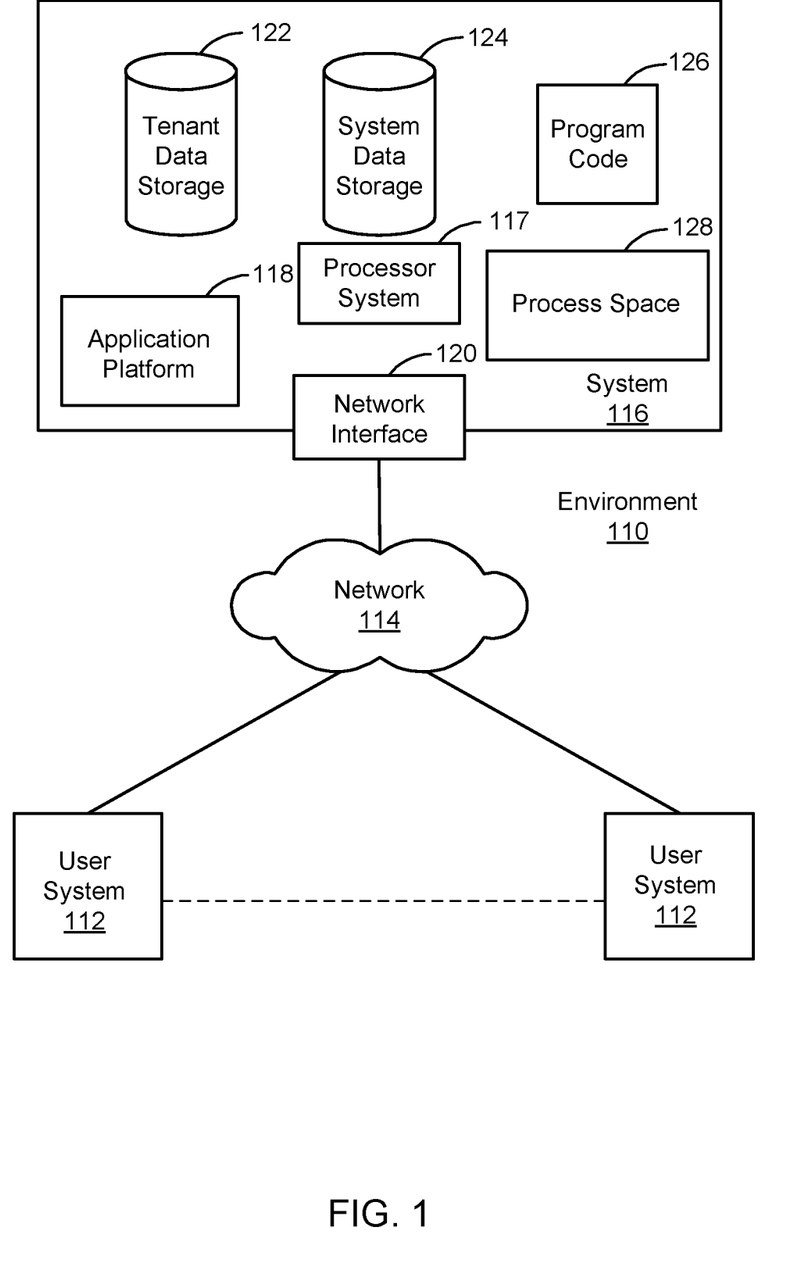
FIG. 1 illustrates a block diagram of an example of an environment where an on-demand database service might be used.

FIG. 1 illustrates a block diagram of an environment 110 wherein an on-demand database service might be used. Environment 110 may include user systems 112, network 114, system 116, processor system 117, application platform 118, network interface 120, tenant data storage 122, system data storage 124, program code 126, and process space 128. In other embodiments, environment 110 may not have all of the components listed and/or may have other elements instead of, or in addition to, those listed above.

Environment 110 is an environment in which an on-demand database service exists. User system 112 may be any machine or system that is used by a user to access a database user system. For example, any of user systems 112 can be a handheld computing device, a mobile phone, a laptop computer, a work station, and/or a network of computing devices. As illustrated in FIG. 1 (and in more detail in FIG. 2) user systems 112 might interact via a network 114 with an on-demand database service, which is system 116.

An on-demand database service, such as system 116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 116" and "system 116" will be used interchangeably herein. A database image may include one or more database objects. A relational database management system (RDMS) or the equivalent may execute storage and retrieval of information against the database object(s). Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 16 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

Several elements in the system shown in FIG. 1 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application (s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide webpages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
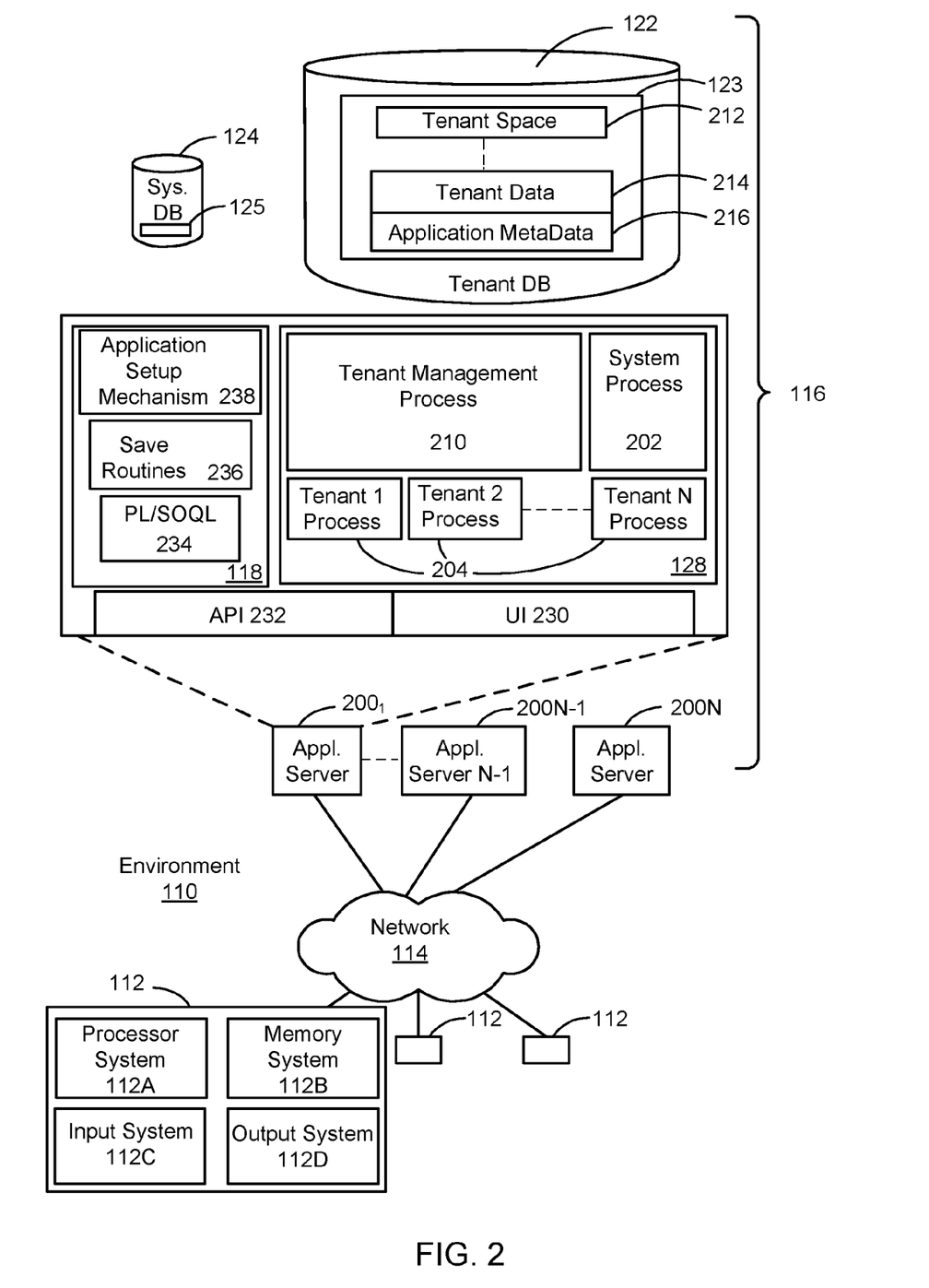
FIG. 2 illustrates a block diagram of an embodiment of elements of FIG. 1 and various possible interconnections between these elements.

FIG. 2 also illustrates environment 110. However, in FIG. 2 elements of system 116 and various interconnections in an embodiment are further illustrated. FIG. 2 shows that user system 112 may include processor system 112A, memory system 112B, input system 112C, and output system 112D. FIG. 2 shows network 114 and system 116. FIG. 2 also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 1. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks. As shown by FIG. 2, system 116 may include a network interface 120 (of FIG. 1) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. Invocations to applications may be detected by one or more system processes, which manages retrieving application metadata 216 for the subscriber making the invocation and executing the metadata as an application in a virtual machine.

Each application server 200 may be communicably coupled to database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200.

In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant, wherein system 116 handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Figure 3:
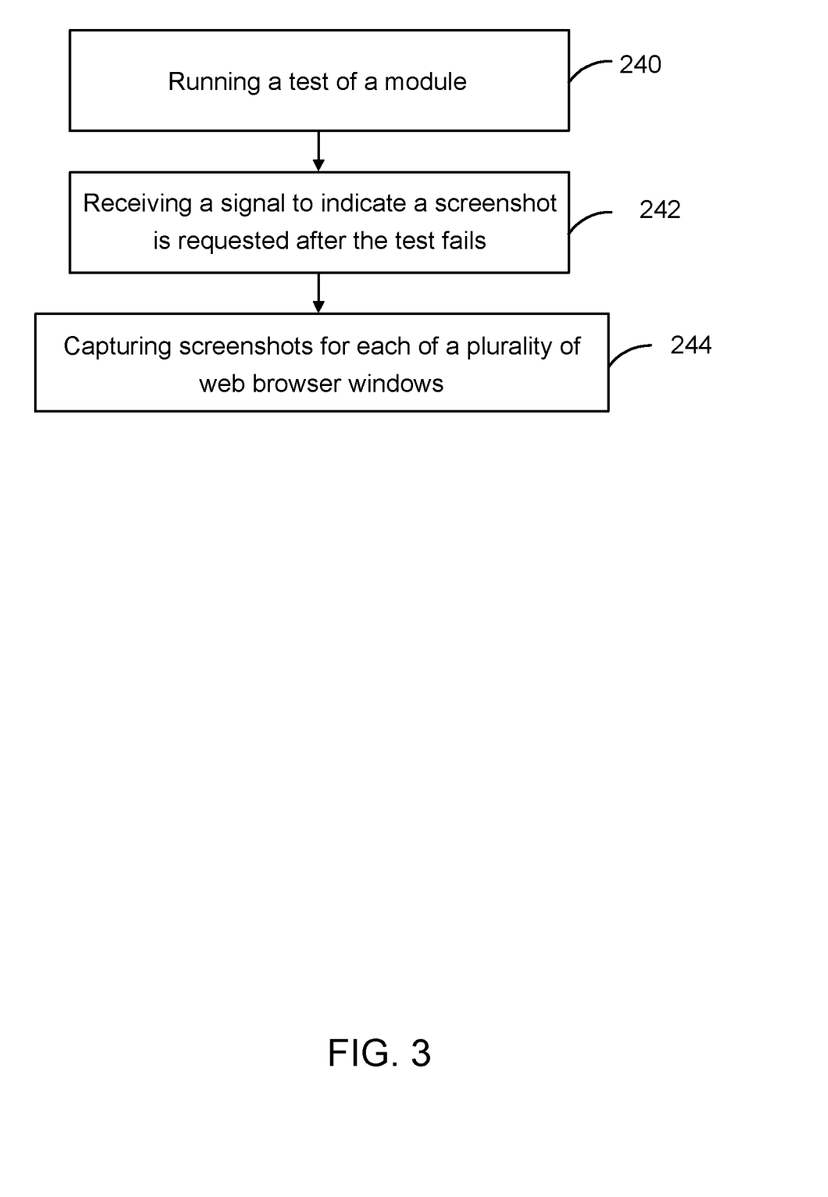
FIG. 3 illustrates an example simplified flow diagram for taking screenshots of a failed application.

Referring now to FIG. 3, shown is an example simplified flow diagram for taking screenshots of a failed application. The method is initiated at block 240 by running a test of a module, such as a module for a multi-tenant database system. In block 242, the system receives a signal to indicate that a screenshot is requested after the test fails. In block 244, the system captures screenshots for each of a plurality of web browser windows. In this fashion, and as discussed in more detail below, screenshots of multiple web browser windows and/or windows can be captured to aid in debugging a failed test. Capturing web browser windows in accordance with particular embodiments, and as discussed in the particular examples herein, may also be utilized in non multi-tenant database systems and/or environments.

Figure 4:
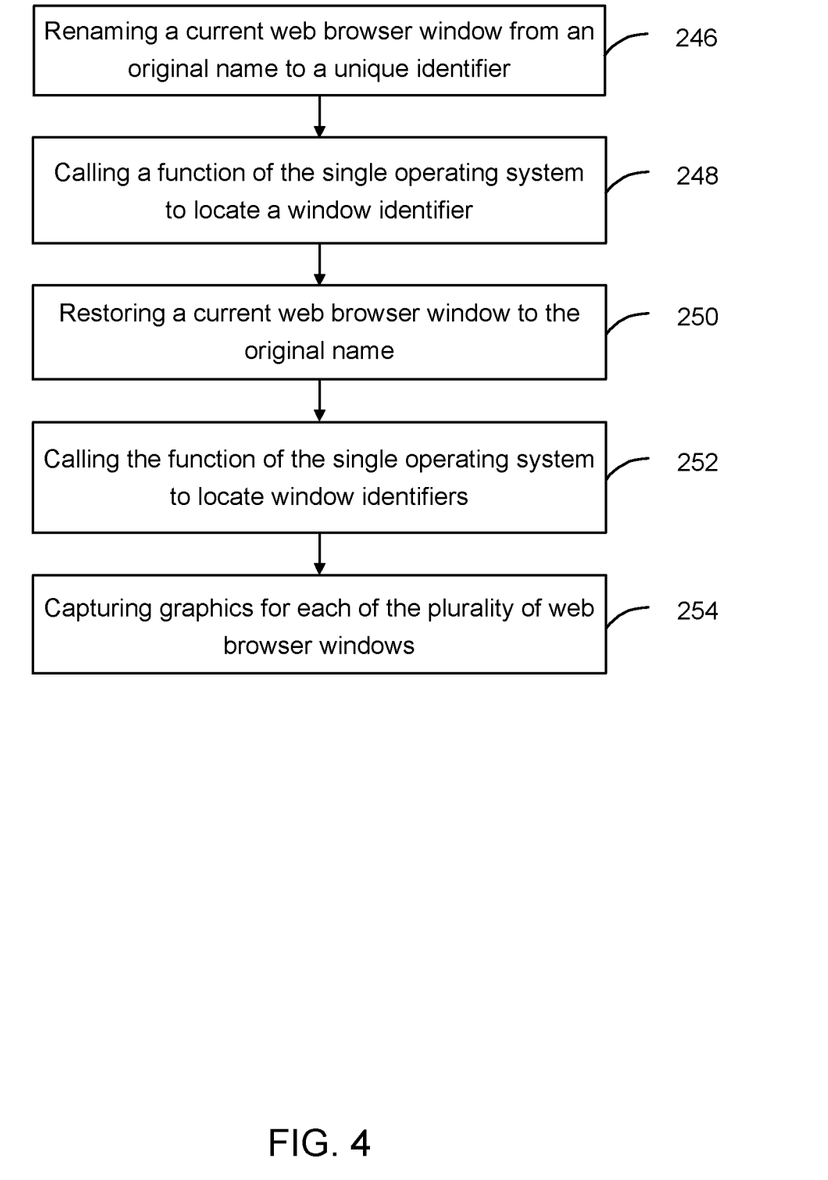
FIG. 4 illustrates another example simplified flow diagram for taking screenshots of the failed application.

Referring to FIG. 4, shown is another example flow diagram for taking screenshots of the failed application. This particular example method is initiated in block 246 by renaming a current web browser window from an original name to a unique identifier. In block 248, a function of the single operating system may be called to locate a window identifier. In block 250, an original name of a current web browser window can be restored. In block 252, a function of the single operating system can be called to locate window identifiers. In block 254, graphics for each of the plurality of web browser windows may be captured. Thus, each web browser and/or window involved in the test via the single operating system can be captured to aid in debugging the failed test.

Figure 5:
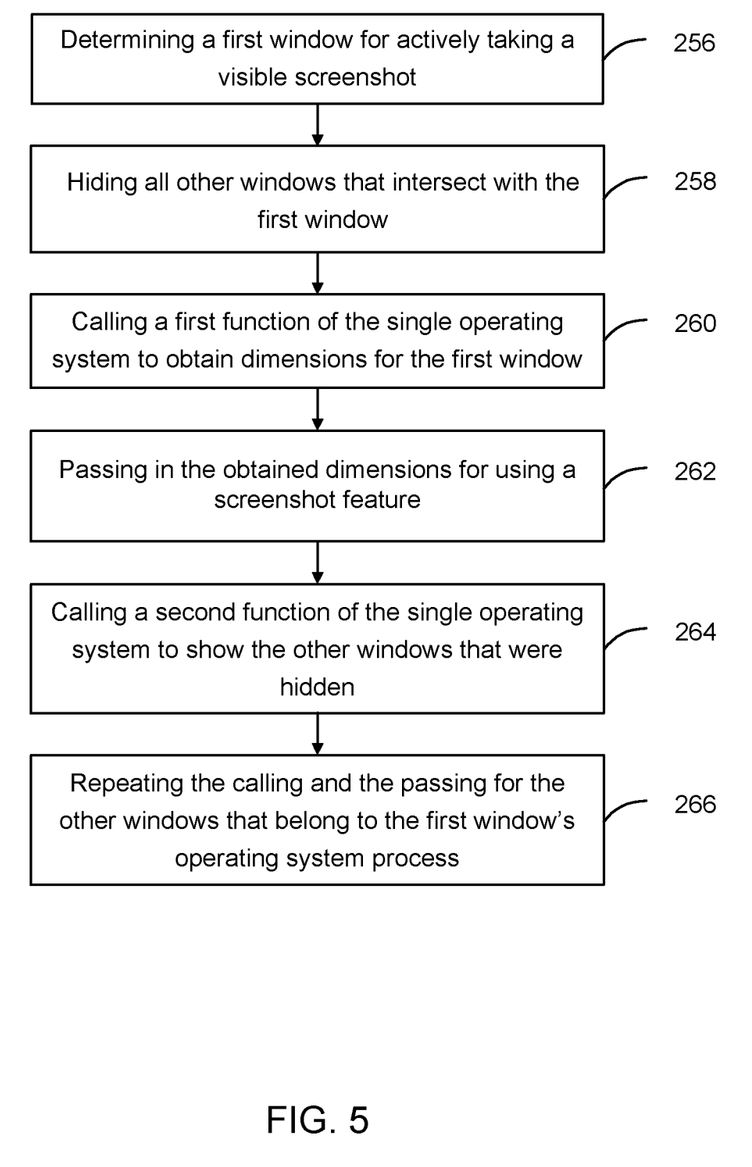
FIG. 5 illustrates yet another example simplified flow diagram for taking screenshots of the failed application.

Referring now to FIG. 5, shown is yet another example simplified flow diagram for taking screenshots of the failed application. This particular example method is initiated in block 256 by determining a first window for actively taking a visible screenshot. In block 258, a second window (or all other windows if more than two windows) is hidden if the first window is intersected by the second window. In block 260, a first function of the single operating system is called to obtain dimensions for the first window. In block 262, the obtained dimensions are passed in for using a screenshot feature. In block 264, a second function of the single operating system can be called to show the second window (or all other windows if more than two windows) that was previously hidden. In block 266, the calling and passing for the second window may be repeated, such as for the other windows that belong to the first window's operating system process. In this fashion, each window that is partially or fully overlapped (intersected) can be captured to obtain the graphical contents of each window to provide complete screenshot information for debugging the failed test.

Figure 6:
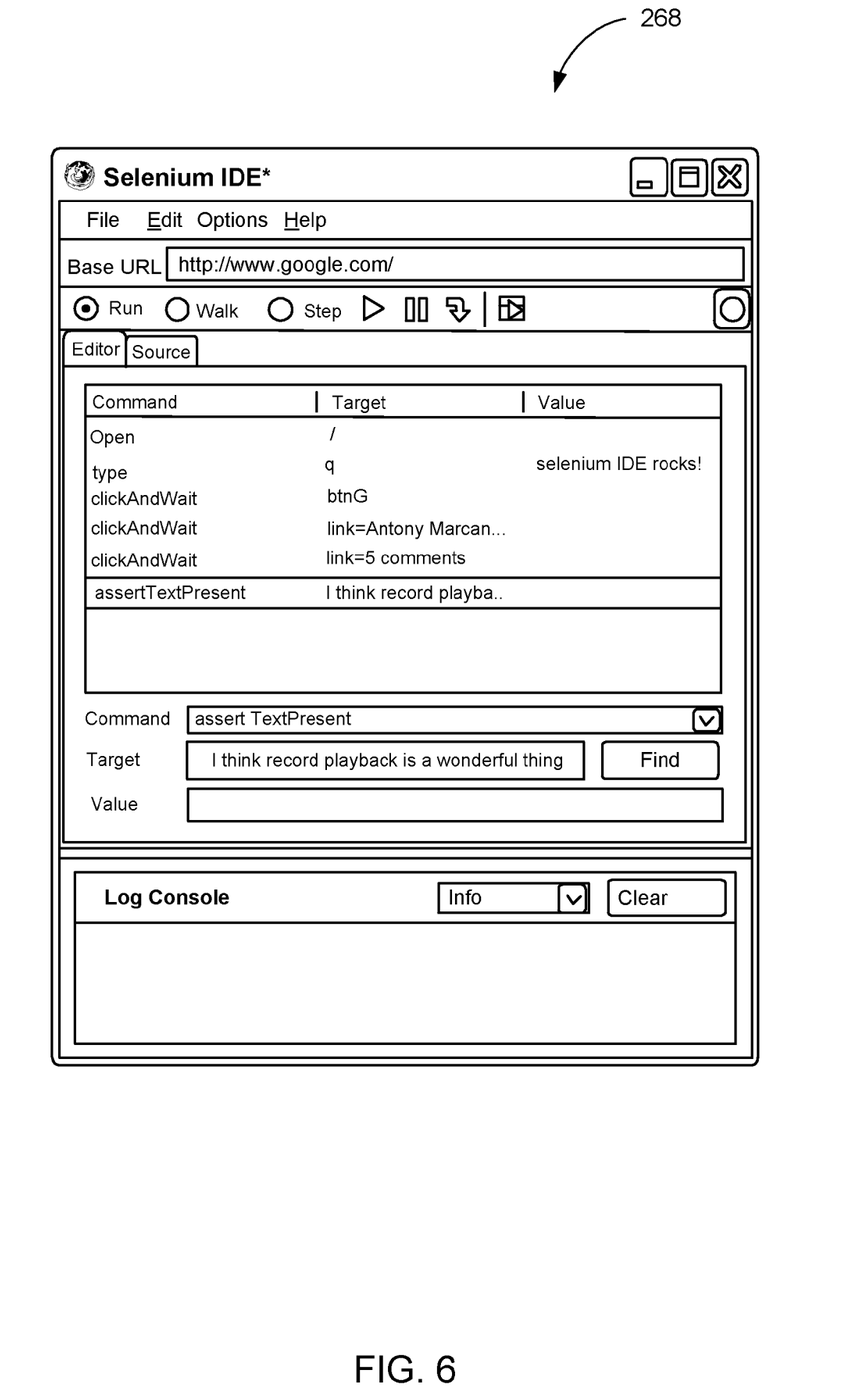
FIG. 6 illustrates an example screenshot of a failed application.

Referring now to FIG. 6, shown an example screenshot 268 of a failed application, e.g., in a multi-tenant database environment 110. The system 116 uses operating system specific functions to take individual window screenshots of each web browser window that belongs to the test's current web browser process. Each window screenshot's dimensions are set to include only the window's graphics. This practice omits other elements on the screen that are not relevant to the test, such as the "Start" menu or the desktop background color or picture. Multiple web browser tests can run on the same virtual machine or non-virtual machine at the same time. With a reader-writer lock, screenshots and normal testing operations are sequenced so that screenshots and normal testing operations don't interfere with each other. Normal testing operations, such as clicking on a link or typing text into an input field, take out a reader lock, etc., can permit multiple concurrent normal testing operations to proceed in parallel on the same machine or virtual machine.

When a screenshot is requested, such as in the event of a test case failure, a writer lock may be requested. A writer lock request can wait until all reader locks are freed before granting the writer lock, and, e.g., only one writer lock at a time may be granted. This can effectively give the screenshot functionality exclusive access to the machine (or virtual machine's) graphical testing environment. After the screenshot is obtained, the writer lock can be freed in order to permit either another writer lock request to be granted, or one or more reader lock requests to be granted. This locking mechanism can allow more than one test to run at a time on the same machine or virtual machine, and the multiple window screenshot features as described herein may allow any of those tests to have their associated browser window contents to be captured correctly.

One particular example screenshot process to ensure that a window is not partially obscured, can include:
(1) Rename the current test browser window to a unique identifier (ID). For example, an internal session ID may be used, or any other suitable identifier, such as large random numbers, memory addresses, etc.
(2) Call an operating system function to locate the operating system (OS) specific window identifier for the window that has the expected name. For example, differentiation between Windows, Linux (X11), and OS X, etc., can be supported.
(3) Restore the original name of the test browser window.
(4) Call an operating system function to get the OS-specific window identifiers of all the other visible windows that belong to the same OS process. Such an implementation can support differences between Windows, Linux (X11), and OS X.
(5) Capture the graphics of the browser windows. For example, the current test browser window that was temporarily renamed earlier and have its screenshot taken first.

The other visible browser windows belonging to the same OS process may follow that window. For example, each browser window screenshot may follow these steps:
(1) Ensure that the window that we are actively taking a screenshot of is visible. It is possible that the previous screenshot iteration hid it, so it may need to be shown.
(2) Hide and make a note of all windows that intersect the window of which we are actively taking a screenshot. This can occur if behind or in front of the window that we are actively taking a screenshot of, since the window ordering information may not be fully reliable in many operating systems. Some operating systems prohibit in fact a process from raising another process's window to the top of the stack of visible windows, though that approach could be used in some embodiments.
(3) After the window that we are actively taking a screenshot of has had a chance to process any OS-delivered window redraw events that were generated as a result of hiding the intersecting windows, the above step may be re-run (that is, try hiding more intersecting windows). This can be repeated until no more intersecting windows were hidden, or if a modest number of iterations were attempted. This approach can ensure that any delayed pop-up windows from this or other tests as well as other programs are hidden. Otherwise, the window that we are actively taking a screenshot of could be partially or fully obscured by that pop-up window, which is analogous to a passerby on a sidewalk walking between a camera and the person or object being photographed (the passerby would be the pop-up window).
(4) Call an operating system function to get the window dimensions of the window of which we are actively taking a screenshot.
(5) Use, e.g., Java's built-in screenshot feature, passing in the desired dimensions and screen location to ensure that only the window that we are actively taking a screenshot of gets captured.

Next, an operating system function can be called to show all windows that were hidden by the loop above.

In certain embodiments, the system implementation may be designed to build on top of a plurality of browser test frameworks. For example, an OS-specific native code can be implemented slightly differently on a per-OS basis. The Linux/X11 version may manipulate browser windows, and get the OS process information for windows using X11 methods, and the Windows version may use Windows API function calls for accomplishing the same things.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for taking screenshots of a failed application, the method comprising:
   concurrently running, in a single operating system process, a plurality of test modules respective each in a separate web browser window on a display screen;
   receiving a signal to indicate a screenshot is requested upon detection by a first one of the test modules of the failed application in order to determine a cause of the failure; and
   capturing screenshots for each of a plurality of overlapping web browser windows corresponding to the first test module, using an iterative process of successively capturing each of the plurality of overlapping web browser windows one at a time, wherein the captured screenshots exclude elements that are unrelated to the first test module;
   wherein capturing comprises:
      determining if a first window for actively taking a screenshot associated with the first test module is visible;
      hiding a second window associated with the first test module if the first window is hidden by, as a result of being intersected by, the second window;
      calling a first function of the single operating system to obtain dimensions for the first window;
      passing in the obtained dimensions for using a screenshot feature;
      calling a second function of the single operating system to show the second window that was hidden; and
      repeating the calling and the passing for the second window.

2. The method of claim 1, wherein capturing screenshots further comprises:
   renaming a current web browser window from an original name to a unique identifier;
   calling a function of the single operating system to locate a window identifier for a window having the unique identifier;
   restoring the current web browser window to the original name;
   calling the function of the single operating system to locate window identifiers for each other web browser window in the plurality of web browser windows; and
   capturing graphics for each of the plurality of web browser windows starting with the current web browser window.

3. A non-transitory computer-readable storage medium having one or more instructions thereon for taking screenshots of a failed application, the instructions when executed by one or more processors causing the one or more processors to carry out:

concurrently running, in a single operating system process, a plurality of test modules each in a separate web browser window on a display screen;

receiving a signal to indicate a screenshot is requested upon detection by a first one of the test modules of the failed application in order to determine a cause of the failure; and capturing screenshots for each a the plurality of overlapping web browser windows associated with the first test module, using an iterative process of successively capturing each of the plurality of overlapping web browser windows one at a time, wherein the captured screenshots exclude elements that are unrelated to the first test module.

4. The computer-readable storage medium of claim 3, wherein the capturing screenshots further comprises:

renaming a current web browser from an original name to a unique identifier;

calling a function of the single operating system to locate a window identifier for a window having the unique identifier;

restoring the current web browser window to the original name;

calling the function of the single operating system to locate window identifiers for each other web browser window in the plurality of web browser windows; and capturing graphics for each of the plurality of web browser windows starting with the current web browser window.

5. The computer-readable storage medium of claim 3, further comprising:

determining if a first window for actively taking a screenshot is visible;

hiding a second window if the first window is intersected by the second window;

calling a first function of the single operating system to obtain dimensions for the first window; and passing in the obtained dimensions for using a screenshot feature.

6. The computer readable storage medium of claim 5, further comprising:

calling a second function of the single operating system to show the second window that was hidden; and repeating the calling and the passing for the second window.

7. An apparatus for taking screenshots of a failed application in an on-demand, multi-tenant computing environment, the apparatus comprising:

a processor; and one or more stored sequences of instructions which, when executed by the processor, cause the processor to carry out:

concurrently running, in a single operating system process, a plurality of test modules on the application using a separate web browser window for each of the plurality of test modules on a display screen;

receiving a signal to indicate a screenshot is requested after a first one of the test modules fails in order to determine a cause of the test failure; and capturing screenshots for each of the plurality of web browser windows associated with the first test module, using an iterative process capturing each of the plurality of browser windows associated with the first test module one at a time;

wherein the captured screenshots exclude elements that are unrelated to the failed test module; and wherein the capturing screenshots comprises:

renaming a current web browser window from an original name to a unique identifier;

calling a function of the single operating system to locate a window identifier for a window having the unique identifier;

restoring the current web browser window to the original name;

calling the function of the single operating system to locate window identifiers for each other web browser in the plurality of web browser windows; and capturing graphics for each of the plurality of web browser windows starting with the current web browser window.

8. The apparatus of claim 7, wherein the processor executing the stored sequence of instructions further carries out:

determining if a first window for actively taking a screenshot is visible;

hiding a second window if the first window is intersected by the second window;

calling a first function of the single operating system to obtain dimensions for the first window; and passing in the obtained dimensions for using a screenshot feature.

9. The apparatus of claim 8, wherein the processor executing the stored sequence of instructions further carries out:

calling a second function of the single operating system to show the second window that was hidden; and repeating the calling and the passing for the second window.

* * * * *